Oct. 19, 1926.
E. AUBRY ET AL
1,603,658
APPARATUS FOR THE AUTOMATIC PLAYING OF VIOLINS OR OTHER STRINGED MUSICAL INSTRUMENTS PLAYED WITH BOWS
Filed July 6, 1923
8 Sheets-Sheet 1

Inventors
E. Aubry
G. Boreau

Oct. 19, 1926.  1,603,658
E. AUBRY ET AL
APPARATUS FOR THE AUTOMATIC PLAYING OF VIOLINS OR OTHER STRINGED MUSICAL
INSTRUMENTS PLAYED WITH BOWS
Filed July 6, 1923    8 Sheets-Sheet 5

Inventors
E. Aubry
G. Boreau
by
Langner Parry Card & Langner
Attys

Oct. 19, 1926. 1,603,658
E. AUBRY ET AL
APPARATUS FOR THE AUTOMATIC PLAYING OF VIOLINS OR OTHER STRINGED MUSICAL
INSTRUMENTS PLAYED WITH BOWS
Filed July 6, 1923    8 Sheets-Sheet 8

Patented Oct. 19, 1926.

1,603,658

UNITED STATES PATENT OFFICE.

EMILE AUBRY, OF PARIS, AND GABRIEL BOREAU, OF VIROFLAY, FRANCE.

APPARATUS FOR THE AUTOMATIC PLAYING OF VIOLINS OR OTHER STRINGED MUSICAL INSTRUMENTS PLAYED WITH BOWS.

Application filed July 6, 1923, Serial No. 649,875, and in France July 8, 1922.

This invention relates to an apparatus for the automatic playing of violins or other stringed musical instruments played with bows, by means of perforated paper rolls or tune sheets.

This apparatus is characterized by the fact that the musical instrument is mounted in a support so as to be able to rock about its longitudinal axis and thus to present to the bow the string or strings upon which the latter is to play, while receiving movements similar to those which are usually communicated to it by the arm of a performer in a direction perpendicular to the longitudinal axis of the instrument, at the same time that keys or stoppers are pressed upon the string or strings at the positions corresponding to the notes to be played, the rocking of the instrument in its support, the longitudinal movements of the bow, and the motion of the keys being controlled by the perforations in the tune sheet corresponding to the piece of music to be played.

The bow is supported by a system of jointed parallelograms, borne by a carriage which travels along a horizontal track, under the action of two connected pneumatic bellows, cylinders or the like, working alternately one as the driver and the other as a brake, and supplied at a pressure which is maintained constant during the whole of their stroke by double pressure regulators.

These double pressure regulators supply the driving and brake bellows or cylinders at differences of pressure which are variable and on one side or the other, regulated by bellows actuated by the perforations in the tune sheet, so as to produce the movements of the bow-carriage at the desired speeds.

The bow is applied to the strings of the instrument with variable pressure, determined by the supply at variable pressure, regulated by the perforations in the tune sheet or at the will of the player, to two pneumatics acting in opposite directions to one another, the bow leaving the string or on the contrary being pressed upon it with suddenly increased force, according as the action of one or other of these two pneumatics is suddenly annuled by placing it in communication with the atmosphere.

The instrument is fixed in a cradle, which rocks around an axis of oscillation, so as to present to the bow the required string or strings, under the action of bellows controlled by the perforated tune sheet, with means for causing a rapid passage from one position to another.

The device for producing the pressure of the keys or stoppers upon the strings is such that the main parts (the operating bellows, levers, pipes, etc.) do not participate in the movements of the instrument, and that the working of this device does not interfere with the movements of the cradle.

The accompanying drawings represent by way of example, one form of construction of the invention.

Figure $9^a$ is a section on a larger scale, of a detail of Figure 9.

Figure $9^b$ is a separate sectional view of a normal relay valve, as used in the apparatus.

Figures $9^c$ and $9^d$ show, in plan view, details of Fig. 9, to a larger scale.

Figures 10 and $10^a$ are, respectively, a plan view, and a side view, of the tracker bar and perforated sheet arrangement.

Figure 11 is a section of one of the double pressure regulators supplying the bow carriage driving and braking means.

Figures $12^a$, $12^b$, $12^c$ are sections of this reversing valve on the lines $12^a$—$12^a$, $12^b$—$12^b$ and $12^c$—$12^c$ of Figure 12.

Figure 18$^a$ represents, in side view, a detail thereof.

As shown in Figures 1 to 7, the bow $a$ is held by screws $a^2$ in a clamp $a^1$, near its heel and approximately at the position of the lift, that is to say at the point where it is usually held by the hand of a player; this clamp $a^1$ is fixed to a rod $a^3$ which can slide in a seating formed in a wooden block $b$ and lined with rubber at $b^1$, so that the bow is not fixed rigidly in this block; the lower end of the rod $a^3$ bears against an elastic stop $b^2$ serving to give the bow a position slightly inclined above the horizontal. An arm $b^3$, secured to the block $b$, carries at its upper end a spring plate $b^4$, bearing upon the bow $a$ with a pressure which can be regulated by a screw $b^5$; this spring $b^4$ holds the bow in its horizontal position.

This elastic clamping system is intended to prevent the bow in any circumstances from performing short-period vibrations of its own, which would affect the working of the apparatus.

The height of the bow holding clamp $a^1$ in relation to the block $b$ can be regulated by slackening the screws $b^6$ which secure the rod $a^3$ between the two halves of the block and moving this rod higher or lower in its seating.

Figure 1:
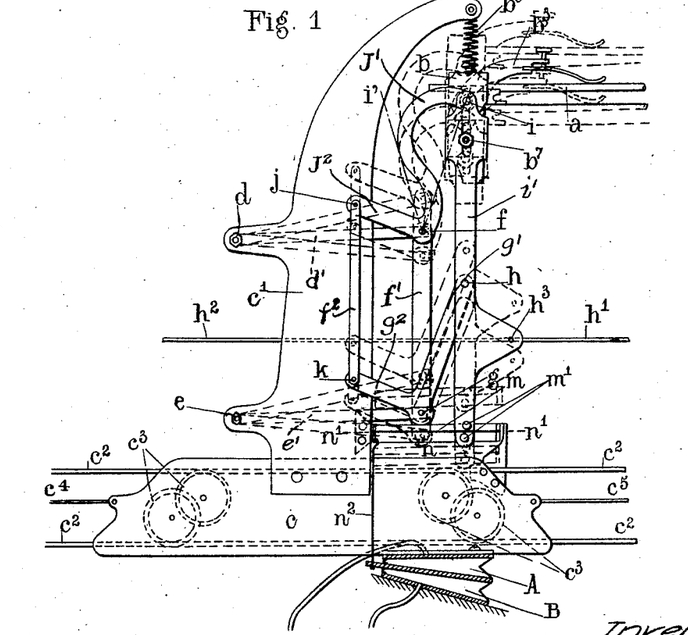
Figure 1 is an elevation of the mechanism for supporting the bow.
Figure 2:
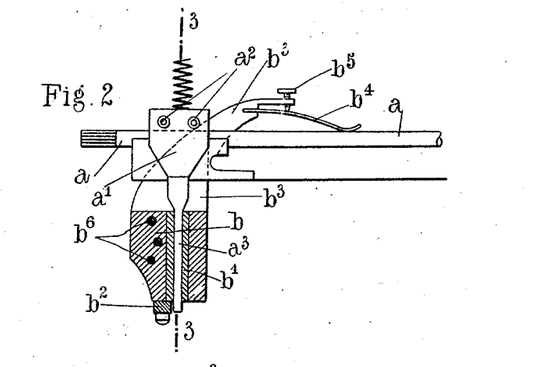
Figure 2 is an elevation, partly in section and on a larger scale, of a detail of this mechanism, Figure 3 being a section on line 3—3 of Figure 2.
Figure 3:
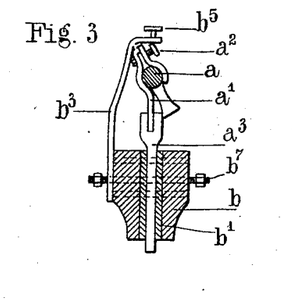

The block $b$ is attached to a system of levers forming two parallelograms arranged on either side of lateral standards $c^1$ $c^1$ fixed upon a carriage $c$; and between and upon said standards $c^1$ $c^1$ are pivoted, at $d$ and $e$ respectively, the cross parts of U shaped members $d^1$ and $e^1$ respectively. The free ends of the lateral branches of said members $d^1$ and $e^1$ are pivotally connected, at $f$ and $g$ respectively, by a link $f^1$ and there is thus obtained a first pair of jointed parallelograms, $d$ $f$ $g$ $e$. To the pivots $f$ and $g$ of each parallelogram bell crank levers are pivotally connected. The free ends of the arms $g^1$ and $j^1$ of said levers are pivotally connected, at $h$ and $i$ respectively, to a vertical link $i^1$, while the free ends of the other arms $j^2$ and $g^2$ of said bell crank levers are pivotally connected, at $j$ and $k$, by a link $f^2$. The links and arms $f^1$ $i^1$ $g^1$ $j^1$ thus constitute a second pair of jointed parallelograms $f$ $g$ $h$ $i$, pivotally connected to the respective parallelograms of the first pair.

The links $i'$ $i'$ of said parallelograms of the second pair are secured by a bolt $b^7$ to either side of the block $b$, which carries the bow. The bow $a$, being perpendicular to the links $i^1$ can therefore move only parallel to itself, that is in a horizontal position.

The whole mechanism is sustained and balanced by a spring $b^8$ acting upon the block $b$.

The carriage $c$, supporting this system of parallelograms, can be displaced along a stationary track formed by rails $c^2$ $c^2$ upon which there run a number of rollers $c^3$ mounted upon the carriage $c$. Small wires $c^4$ $c^5$ attached to the carriage $c$ are adapted to reciprocate the latter; two other lengths of light wires $h^1$ $h^2$ attached at $h^3$ to an extension of one of the links $i^1$ communicate a rapid oscillatory movement of small amplitude to the arms $i^1$ supporting the bow, as will be explained hereafter. The bow is thus held elastically in a block $b$, itself fixed to a system of jointed levers, adapted to allow the bow longitudinal movements of small amplitude, and to allow as regards height or level only movements parallel to the longitudinal direction of the bow. Under these conditions, if the bow is pressed upon the strings of the instrument with a given pressure, this pressure remains constant even if by reason of the various flexions due to the bow and the strings, the bow is caused to move vertically, and whatever be the part of the bow in action.

In order to vary the pressure applied by the bow to the strings of the instrument, there is employed a group of two bellows A and B (Figures 1 and 9), acting in opposite directions upon the lever $h$ $i$ carrying the bow $a$, by means of a cord $m$ attached to and stretched between the free ends of a U shaped frame $n$ movable upon the axis $n^1$ $n^1$ on the side opposite to that carrying the cord $m$; the lower end of one of the links $i^1$ is provided with two rollers $m^1$ which travel on the cord $m$ during the movements of small amplitude of the bow. A wire $n^2$ connects the frame $n$ to the movable middle flap of the two bellows A B, of which one A is fixed to the carriage $c$ while the other B rests against an abutment; the two bellows thus actuate the frame $n$ and the pressures which they transmit to it are communicated by means of the cord $m$, the rollers $m^1$, and the link $i^1$, through the bow to the strings of the instrument.

Figures 4, 5, 6, 7:
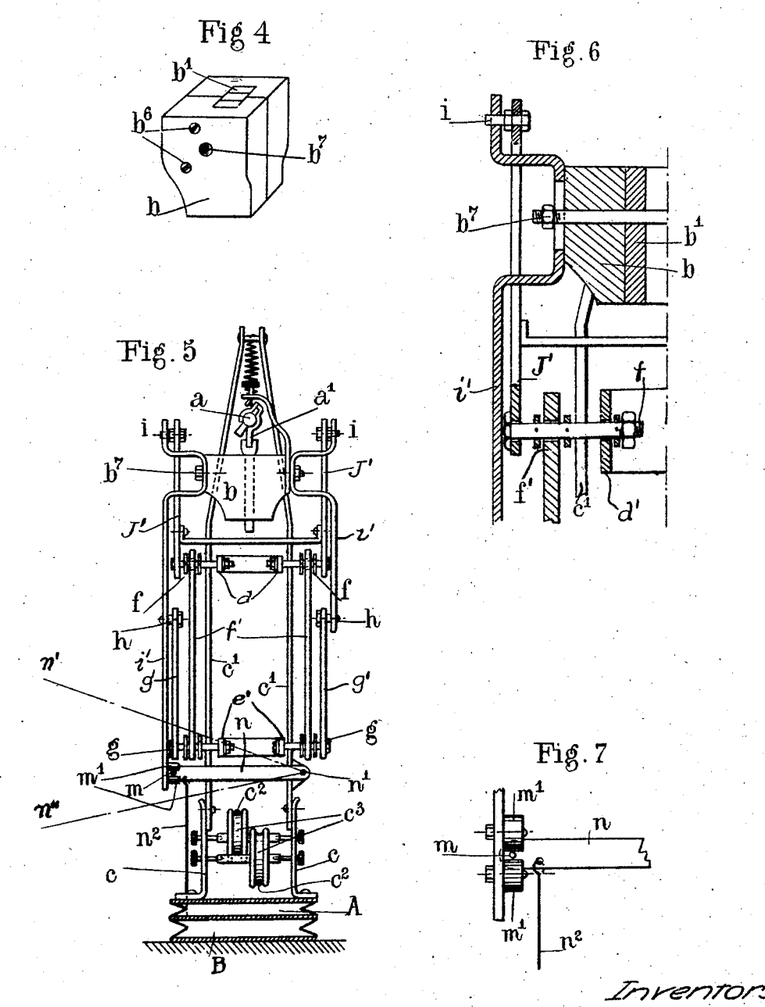
Figure 4 is a perspective view of a detail.
Figure 5 is an elevation, at right angles to Figure 1, of the bow-supporting mechanism.
Figure 6 is a section on a larger scale of a part of this mechanism.
Figure 7 is an elevation, also on a larger scale, of another part of the same.

The extreme positions, upper and lower, of the articulated parallelograms $d$ $e$ $f$ $g$ and $f$ $g$ $h$ $i$, as well as those of the U-shaped piece $n$, and of the member $a$, are shown in Fig. 1 in broken line. Fig. 5 also indicates in broken line, the extreme upper and lower angular positions of the U-shaped piece $n$, at $n'$ and $n''$ respectively.

Figures 8, 9:
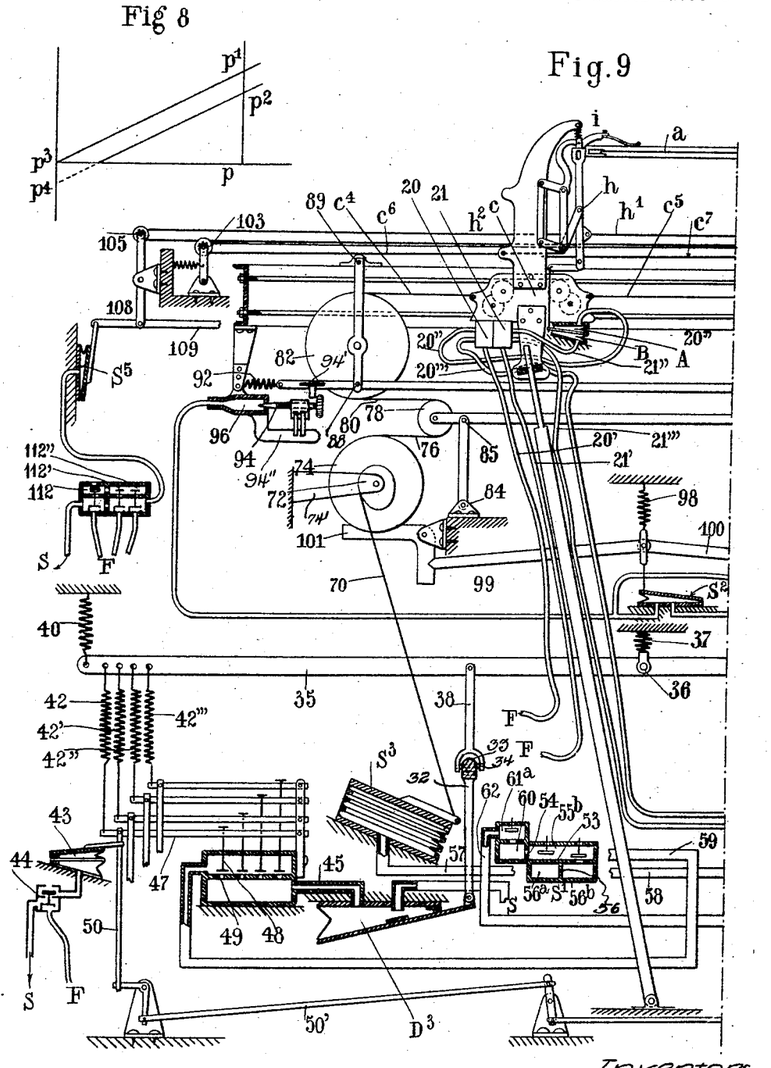
Figure 8 is a diagram explaining the working of the two bellows mounted upon this support.
Figures 9 and $9^A$, located side by side, are a general view of the bowing system.
Figure 9A:
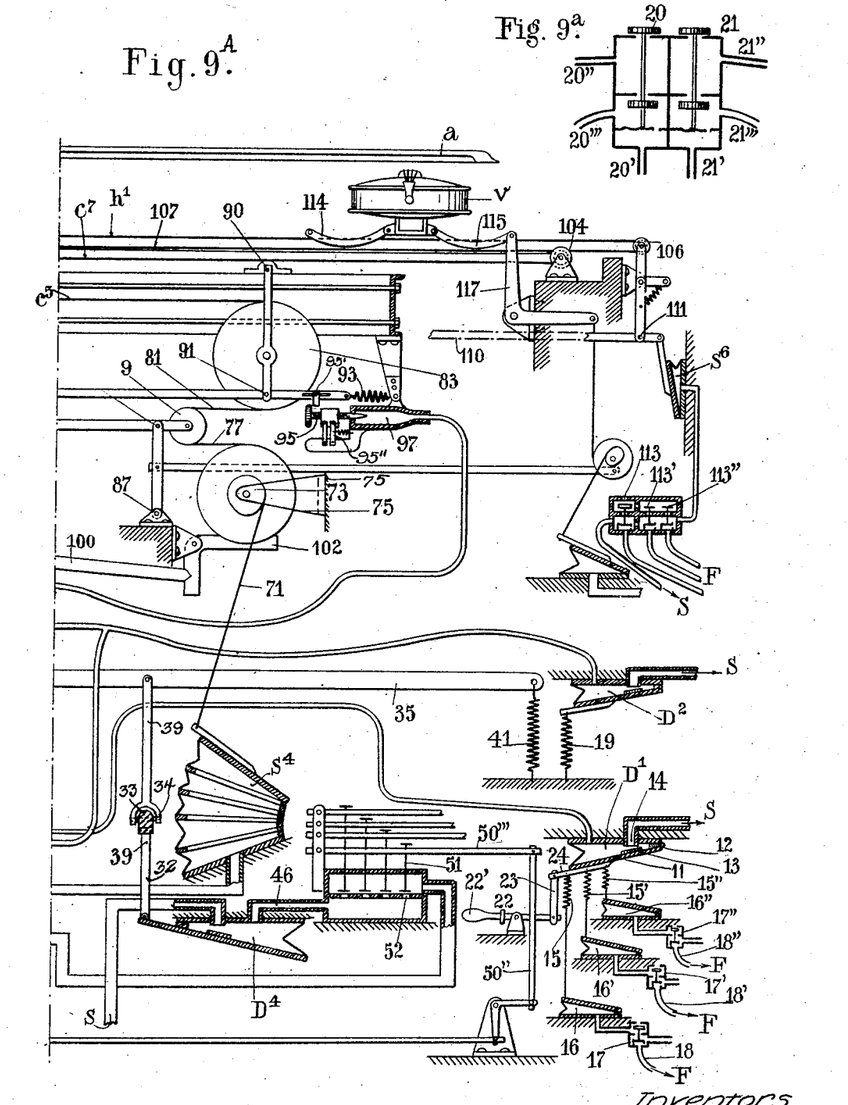
Figures 9B, 9C, 9D, 10, 10A, 11:
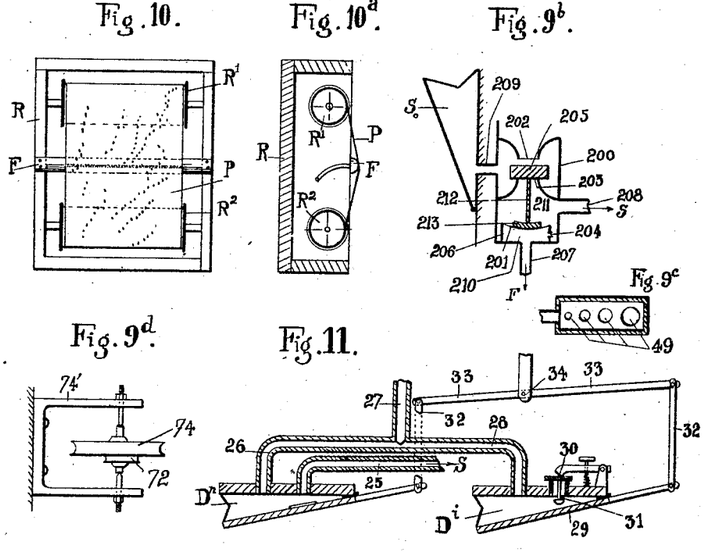

The bellows A acts to press the bow $a$ upon the strings with variable pressure; it is supplied at variable pressure through a pressure regulator $D^1$ (Figure 9). The latter device consists of a bellows of which the movable side 11 hinged at 12 carries a pad 13 adapted to close more or less the orifice 14 connected to the suction S. The air pressure at the exit from the regulator $D^1$ and therefore in the bellows A is determined by the degree of opening of the flap 11, that is to say by the tension of the springs 15, 15', 15'', ..., as regulated by the degree of closing of the bellows 16, 16', 16'', ..., themselves connected to the suction S when the normal relay-valves 17, 17', 17'', ..., as described below with reference to Fig. $9^b$ are opened, that is when the pipes 18, 18', 18'', ..., connected to the apertures in the tracker bar F, controlled by the perforations in the tune sheet, place these relay-valves in communication with the atmosphere. The bellows 16, 16', 16'', ..., are arranged to collapse completely under the average tension of the suction S, and the springs 15, 15', 15'', ..., are designed to give the desired range of pressures, according to their respective extensions produced by the collapse of the bellows.

The perforated paper P (see Figs. 10 and $10^a$) moves in front of the tracker bar F while unrolling from a roller $R^1$ and rolling up on a roller $R^2$, which rollers are both mounted so as to be able to turn in a supporting frame R. At the tracker bar F, the different pipes open, such as the pipes 18, 18' of Fig. $9^A$, connected to normal relay valves such as the valves 17, 17' of Fig. $9^A$.

Each normal relay valve, see Fig. $9^b$, comprises a body 200 furnished with two seats 202 and 203 for the valve member 205. A small box 206 positioned in the interior of the valve casing and forming a part of the casing 200, carries a membrane 201 which is pierced with a capillary opening 204. The box 206 and the membrane 201 divide the interior space of the body 200 into two chambers 210 and 211. The pipes 207, 208 and 209 connect the valve casing compartments respectively with the tracker bar F, with the suction pipe S and with the bellows $S_0$. The valve member 205 is rigidly connected by means of a rod 212 to a second valve member 213 which rests upon the membrane 201.

When the opening of the tracker bar F connected to the pipe 207 is closed by the paper roller, the valve member 205 rests on the lower seat 203 as a result of the partial vacuum which exists in chamber 211 which is connected by pipe 208 to the suction pipe S. As a result of the communication established by the capillary opening 204 between the chambers 210 and 211 there exists in the chamber 210 the same partial vacuum as in the chamber 211. Therefore, the membrane 201 is in equilibrium and the valve member 205 which is supported by the membrane rests by gravity on its seat 203.

When the opening of the tracker bar F referred to above becomes brusquely opened by a perforation in the paper roller, and thus the pipe 207 is placed in communication with the atmosphere, the atmospheric pressure is conducted by this pipe 207 to the interior of chamber 210. This pressure raises the membrane 201 and as a result raises the valve member 205 which is separated from its seat 203 and forced onto its upper seat 202. Communication is thus established between the suction pipe S and the bellows $S_0$ by means of the pipes 208 and 209 and the valve body. The suction pipe S draws the air out of the bellows $S_0$ and causes the bellows to close. As soon as the paper roll closes the hole in the tracker bar which is connected to the pipe 207 equilibrium is established again between chambers 210 and 211, so that the membrane 201 moves downward and the valve member 205 is forced by gravity on its roller seat 203 to thus cut off communication between the suction pipe S and the bellows $S_0$.

Further in order to obtain variable forces upon the flap 11 of the regulator bellows $D^1$, the springs 15, 15', 15'', ..., may be suppressed and a varying number of bellows caused to act directly in their stead, these bellows being supplied by a normal pressure regulator at constant pressure; this applies also in the analogous cases occurring in the description of the present invention.

The bellows A exerts upon the bow $a$ a force substantially proportional to the pressure existing in the regulator $D^1$. The bellows B, which acts in the contrary sense, is supplied through a normal regulator $D^2$, the pressure of which is regulated once for all by the spring 19 so as to exert a constant force upon the bow.

At any given moment the bow $a$ presses upon the strings (Figure 8) with a force $pp^2$ equal to $pp^1 - p^1 p^2$, where $pp^1$ is the variable pressure furnished by the bellows A and $p^1 p^2$ is the constant pressure furnished by the bellows B. The two bellows A and B may be placed in communication with the atmosphere when desired, by means of the valves 20 and 21 (Figures 9 and $9^a$); these valves are connected through the pipes 20' and 21' to two apertures in the tracker bar F, uncovered by the perforated tune sheet. The valves communicate through 20'' and 21'' with the bellows A and B, and through 20''' and 21''' with the corresponding pressure regulators $D^1$ and $D^2$. When the valve 20 of the bellows A operates, that is to say when it is placed in communication with the atmosphere through 20', the action of this bellows A is suddenly annulled; consequently the bow $a$ is subjected solely to the action of the force $p^3 p^4$ (Figure 8) equal to $p^1 p^2$, and suddenly leaves the string. When on the contrary the valve 21 operates, the action of the bellows B is annulled, and the bow is subjected to a pressure $pp^1$ instead of $pp^2$; the cord is then attacked with full vigour.

A system of levers 22, 23, 24, connected to the regulator bellows $D^1$ and terminating in a handle 22' placed within reach of the player, allows the latter to vary the pressure of the regulator and therefore the pressure of the bow upon the strings, thus modifying to a certain extent the expression with which the piece of music is played.

The movements of the bow-carriage $c$ are controlled as explained below, by two bellows $S^3$, $S^4$, (Figs. 9 and 9$^A$) connected mechanically in such a way that when one of them opens the other closes; the bellows which opens acts as the motor or driver, and the one which is closing acts as a brake or cushioning device.

The connected bellows $S^3$ and $S^4$ are set in motion when the difference of the pressures is sufficient to exert upon the movable flaps of the bellows a force greater than the resisting force. Each of the bellows $S^3$, $S^4$ is connected by a pipe line to a double pressure regulator, $D^3$, $D^4$ respectively the object of which is to establish at the desired moment pressures which can vary in intensity but remain constant throughout the stroke of the bellows $S^3$, $S^4$. Each pipe line comprises a partition provided with orifices, and the number of said orifices which are open at a given moment, is controlled by the perforated tune sheet, as explained hereafter, so as to vary the speed of flow of the air through said pipe line.

The speed obtained varies according to the rate of flow of the air through the pipe lines. The pressures and the effective sectional areas of flow in the pipe lines are regulated jointly so as to permit:

(1) A flow through the orifices precisely equal to that which is required by the variations of capacity of the bellows or cylinders at the pressure in question;

(2) A regulation by braking or cushioning effect to give a constant speed, any tendency to acceleration producing a complementary force on the brake side, but any tendency to slowing down reducing the effect of the brake or cushioning action.

Each of the double pressure regulators $D^3 D^4$, shown diagrammatically upon Figures 9 and 9$^A$, comprises two oppositely acting regulators and is actually constructed as follows: Let $D^n$ (Figure 11) be a normal regulator in communication through a normal relay-valve (as in Fig. 9$^b$ and above described in reference thereto) with the suction S through the pipe line 25; it is connected through 26 on the one hand with the pipe 27, itself connected to the bellows, in which a constant pressure is to be established, and on the other hand through the pipe 28 with an oppositely acting regulator $D^i$. The latter consists of a bellows, of which the movable flap 29 can produce the lift of a valve 30 by means of an adjustable stem 31. The movable flap 29 of this bellows is connected by a link 32 like that of the normal regulator $D^n$, to a lever 33 having two arms of slightly different length, so that a force exerted upon the lever 33 at 34 is divided unequally between the two pressure regulators $D^n$ and $D^i$.

Under these conditions, if the normal regulator $D^n$ is set for any given pressure P, the opposite bellows $D^i$ collapses at a slightly greater value P+$\epsilon$; the valve of this regulator $D^i$ then opens and restores the set pressure P. When the bellows connected to the pipe line 27 acts as driver, it is supplied at the set pressure P of the normal regulator $D^n$ during the whole stroke. If it is acting as a brake, there being no longer any communication with the suction S; the brake bellows creates in the pipe a pressure which if greater than the value P+$\epsilon$ causes the valve 30 to lift and thus restores the pressure, so that the latter can never exceed the value P+$\epsilon$.

As shown in Figs. 9 and 9$^A$, the balance lever 35, suspended centrally at 36 by means of a spring 37, is connected by a rod 38, 39, respectively at 34, to the lever 33, to which are attached (as explained hereinbefore with reference to Fig. 11) the links 32 connected to the movable flaps of the oppositely acting regulators of each of the double pressure regulators $D^3$ and $D^4$ respectively. The spring 37 is tensioned so that the two regulators give identically the same pressure P. To the opposite ends of the balance lever 35 are attached springs 40 and 41, adjusted to give a pressure $P^1$ in the regulator $D^3$ and nil pressure in the regulator $D^4$. The pressure $P^1$ is the maximum pressure required to give the highest speed. Springs 42, 42', 42'', ..., the action of which opposes that of the end springs 40 and 41, are attached to one end of the balance lever 35 facing the spring 40; these springs 42 can be tensioned by bellows 43, ..., the closing of which is effected by means of a normal relay-valve 44, ..., as per Fig. 9$^b$ and described in reference thereto, by the perforated tune sheet.

When the perforation causes the closing of one or more of these bellows 43, ..., and therefore the tensioning of the corresponding spring or springs 42, ..., the suction or fall of pressure decreases in left-hand regulator $D^3$, the effect of the springs 37 and 40 upon the rod 35 being decreased in a corresponding manner; on the contrary the depression increases in the right-hand regulator $D^4$. The depression in the regulators $D^3 D^4$ depends upon the pull exerted upon the movable flap thereof by the rods 38, 39 respectively, under the action of the springs 37, 40, 41. When bellows 43, are closing themselves, they pull upon the springs 42, and as these springs are acting in a direction opposite to that of the springs 37 and 40, and in the same direction as the spring 41, the depression decreases in the regulator $D^3$ and increases in the regulator $D^4$. The closing of the bellows 43, . . ., (of which only a single one is shown for clearness), with additive effect, creates therefore in the regulators $D^3$ $D^4$ differences of pressure increasing with the number of bellows 43, . . ., coming into operation.

Each bellows 43, . . ., actuates on the other hand two plugs, arranged respectively in the pipe lines 45 and 46 extending between the regulators and the bellows $S^3$ $S^4$ which act alternately as motor and brake; as shown the bellows 43 actuates through the lever 47 connected to its movable flap the plug 48 controlling an orifice 49 in the pipe line 45 leading from the double regulator $D^3$; on the other hand, it actuates through the system of levers 50, 50′, 50″, 50‴, the plug 51 controlling the orifice 52 in the pipe line 46 extending from the pressure regulator $D^4$. Consequently when a bellows 43, . . ., collapses, it stretches the corresponding spring 42, . . ., and at the same time closes one section of the passage in the pipe lines between the pressure regulators $D^3$ $D^4$ and the motor and brake bellows.

The springs 42, . . ., and the number of orifices 49 controlled by the plugs 48, . . ., are so arranged as to provide a speed of flow variable at will between the required limits.

The double regulators $D^3$ $D^4$, thus supplied at variable differences of pressure, are connected to the bellows $S^3$ $S^4$ by means of a change-over or reversing valve $S^1$ (see Figures 9, 12, $12^a$, $12^b$, $12^c$), designed to establish the difference of pressure in the correct sense, according to the direction of movement.

Figure 12:
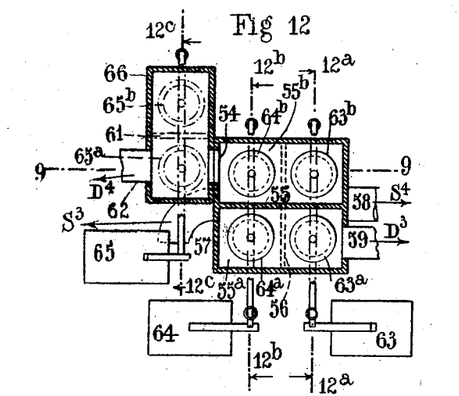
Figure 12 is a plan of the reversing valve controlling the direction of motion of the bow-carriage.

This reversing valve consists of a box divided by a horizontal partition 53 into two chambers, an upper and a lower; these two chambers are in turn divided by walls 55, 56, arranged at right angles in the two chambers, into two compartments each. The lower chamber comprises a left-hand compartment $56^a$, to which there is connected a pipe 57 leading to the bellows $S^3$, and a right hand compartment $56^b$, to which is connected the pipe 58 leading to the right hand bellows $S^4$ (Figure $9^A$). The upper chamber comprises a front compartment $55^a$, connected as shown in Figure 12 by the pipe 59 to the high-pressure regulator $D^3$, and a rear compartment $55^b$ communicating through the orifice 54 with the lower chamber 60 of a box 66, attached at one side and rearwardly of the main box. The box 66 is divided by the horizontal partition 67 into two chambers; the upper chamber is in turn divided by the wall 61 into front and rear compartments $61^a$ and $61^b$, the front compartment $61^a$ of the upper chamber being connected by the pipe 62 to the low-pressure regulator $D^4$.

Figure 12A:
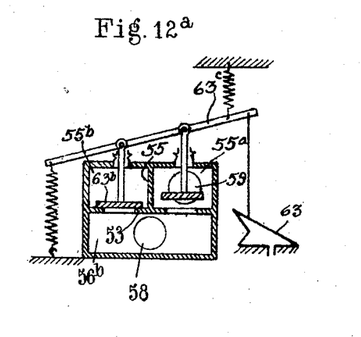

In the horizontal partition dividing the first box there are mounted two pairs of valves; above the right hand compartment $56^b$ are arranged two valves $63^a$, $63^b$, pivoted to a lever $63^c$, subject to the action of two opposing springs at its ends and controlled by a bellows 63 (Figure $12^a$) under the action of the perforated tune sheet through a normal relay-valve constructed as described with reference to Fig. $9^b$. When the bellows 63 is distended as shown in the figure, the valve $63^a$ is open and the valve $63^b$ closed; when the bellows collapses, the reverse is the case. These two valves $63^a$ and $63^b$ control the communication of the compartment $56^b$ of the lower chamber with the front and rear compartments $55^a$ and $55^b$ of the upper chamber.

Figure 12B:
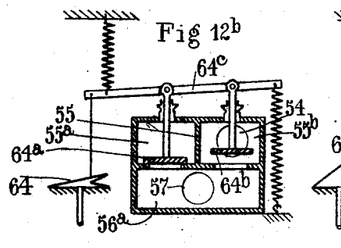

Similarly as shown in Figure $12^b$, the two valves $64^a$ and $64^b$, pivotally attached to the lever $64^c$ and operated by the bellows 64, control the communications of the left hand compartment $56^a$ of the lower chamber with the front and rear compartments $55^a$ and $55^b$ of the upper chamber.

Figure 12C:
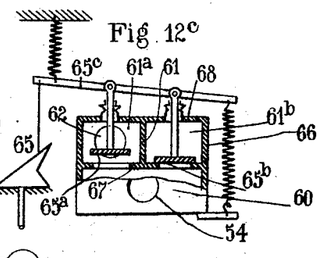

Lastly the two valves $65^a$ and $65^b$, pivotally attached to the lever $65^c$ and operated by the bellows 65, control the communications between the lower chamber 60 and the two front and rear compartments $61^a$ and $61^b$ of the lateral box 66; an opening 68, formed in the top of the rear chamber $61^b$ places it in communication with the atmosphere. The bellows 65 is normally distended, so that the valve $65^a$ is open and the valve $65^b$ is closed, as represented in Figure $12^c$. The stems of the valves $63^a$, $63^b$,—$64^a$, $64^b$,—$65^a$, $65^b$, connected to the levers $63^c$, $64^c$ and $65^c$ respectively, pass outwardly through suitable stuffing boxes, as shown in Figs. $12^a$, $12^b$, $12^c$.

If it be supposed that the bellows 63 is open and the bellows 64 collapsed (see Figures $12^a$ and $12^b$), the high pressure regulator $D^3$ is in communication through the pipe 59, the compartment $55^a$, through the open valve $63^a$, the compartment $56^b$, and the pipe 58, with the bellows $S^4$, which closes and acts as motor; by means of the transmission 71 . . . 70, the bellows $S^3$ is caused to open, thus acting as a brake. This bellows $S^3$ communicates through the pipe 57, the compartment $56^a$, the open valve $64^b$, the chamber $55^b$, the orifice 54, the compartment 60, the open valve $65^a$, the compartment $61^a$, and the pipe line 62, with the low-pressure regulator $D^4$.

When the bellows 63 is collapsed and the bellows 64 open, the opposite effect is produced; the bellows $S^3$ is placed in communication with the high-pressure regulator $D^3$ and acts as motor, while the bellows $S^4$ communicates with the low-pressure regulator $D^4$ and acts as brake or cushioning means.

The bellows 65 is designed to bring the bellows acting as brake suddenly to the atmospheric pressure, so as to obtain in certain cases very rapid accelerations.

When this bellows 65 collapses, the valve $65^a$ is closed and the valve $65^b$ is opened; under these conditions the bellows $S^3$, still supposing it to be acting as the brake, communicates through the pipe 57, the compartment $56^a$, the open valve $64^b$, the chamber $55^b$, the orifice 54, the compartment 60, the open valve $65^b$, the compartment $61^b$ and the orifice 68 with the atmosphere; the valve $65^a$ being closed, the pressure regulator cannot discharge into the open air.

It is seen then that by the control of the bellows 63, 64 and 65 at the desired moments by the perforated tune sheet, there are obtained the desired movements of the bellows $S^3$ $S^4$.

These bellows $S^3$ $S^4$ (Figure 9). thus subjected through pipe lines of variable sectional areas, to pressures the difference of which may be varied as required, actuate the bow-carriage $c$ by means of belts or small chains 70, 71, passing over cams 72, 73, respectively fast to pulleys 74, 75, by flexible connections 76, 77, pulleys 78, 79, connections 80, 81, pulleys 82, 83, and the connections $c^4$ $c^5$ attached to the carriage $c$. These pulleys and cams 72, 74 and 73, 75 are journalled in brackets 74' and 75' respectively, secured to a fixed frame (see Figs. 9, $9^A$ and $9^d$). The cams 72, 73, are intended to equalize the torque exerted by the bellows $S^3$ $S^4$ upon the pulleys 74, 75; these cams have a profile such that they compensate for the variations of the force exerted by the bellows according to their degree of opening, the variation thus compensated being due to the action of the flexible covering of the bellows, their hinges, etc.

The pulleys 74 and 75 are mounted upon fixed axes; the pulleys 78 and 79 have their axes supported on a deformable parallelogram 84, 85, 86, 87, of which the side 86—87 takes part in the rocking movements of the violin when changing the string in play, as hereafter explained. The relations of the levers which transmit the deformation are such that when all the apparatus is at rest the movements transmitted to the instrument in order to give a certain tilt communicate to the carriage $c$ and therefore to the bow, movements of identical amplitude and speed, so that no relative displacements of the bow and the strings take place owing to the tilting of the instrument, and consequently there are no parasitical noises.

The pulleys 82 and 83 have their axes supported by the deformable parallelogram 88, 89, 90, 91; the side 88—91 of this parallelogram has its ends extended and connected to two springs 92 and 93, these ends carrying each an adjustable tappet 94', 95', respectively, adapted to act upon a needle valve 94, 95, respectively, adjustably carried by a screwthreaded member. These needle-valves 94, 95 are constantly pulled, so as to close the orifices of respective chambers 96, 97, both connected to a bellows $S^2$, by a spring 94', 95' respectively, which is attached at one end to a bracket integral with the chamber 96, 97, and, at the other end, to one of the links, connecting said bracket to the screwthreaded bearing member for the needle-valve 94, 95. The arrangement is such that one of the needle-valves is struck by its tappet 94', 95' and thus opens the orifice of the corresponding chamber 96, 97, when an additional passive resistance increases the opposition to motion of the carriage $c$ in either direction; the opening of one of these orifices 96, 97 causes an escape of air from the bellows $S^2$, which serves to operate by its movable flap, connected through a spring 98 to levers 99, 100, the brake members 101, 102, pressing lightly against the pulleys 74, 75. The braking effort, fixed normally for a given value of the resistance to motion, is thus reduced if the carriage encounters in its travel any abnormal resistance, due for example to increased pressure of the bow upon the strings.

In addition to the reciprocating movement which is communicated to the bow $a$ by the travel of the carriage $c$ as drawn along by the flexible connections $c^4$ $c^5$, as described above, the bow $a$ can be given rapid movements of small amplitude, analogous to those given by the wrist of a player, this being produced as follows:—

To the carriage $c$ are attached the two ends $c^6$ $c^7$ of a length of wire, passing over two pulleys 103, 104. The wire, of which the ends $h^1$ $h^2$ are attached to the pivoted arm $h$ $i$ supporting the bow $a$, passes over two pulleys 105, 106. The upper length of the former and the lower length of the latter wires are connected at a point 107. Under these conditions, if the pulleys 105 and 106 are held stationary, the point 107 receives no relative motion in relation to the carriage $c$, during the reciprocation of the latter. On the other hand, if the two pulleys 105, 106, held fast in relation to one another by the articulated system 105, 108, 109, 110, 111, 106, are displaced at a certain speed by the bellows $S^5$ $S^6$, relative movements will be communicated to the bow $a$ independently of the movements transmitted to it by the carriage $c$. It will therefore be possible by varying suitably the speed of these movements in relation to one another, to execute all possible combinations of the movements usually obtained by the arm and the wrist of a player.

In order to obtain variable rates of collapse of the bellows $S^5$ and $S^6$, the latter are supplied by means of valves 112, 112', 112'', ... and 113, 113', 113'', ... of variable number, presenting variable passage area, and controlled by the perforated tune sheet; the valves 112 and 113 determine the bringing into action of the bellows $S^5$ and $S^6$, while the valves 112', 112'', ..., 113', 113'' ... cause the passage area to be varied.

Figure 13:
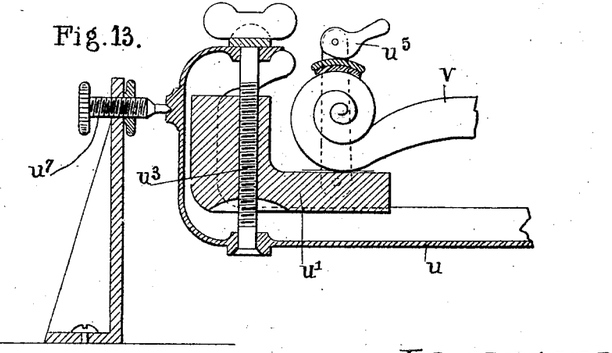
Figures 13 and 14 are longitudinal vertical sections, showing the method of supporting the violin in its cradle, at its two ends respectively.
Figure 14:
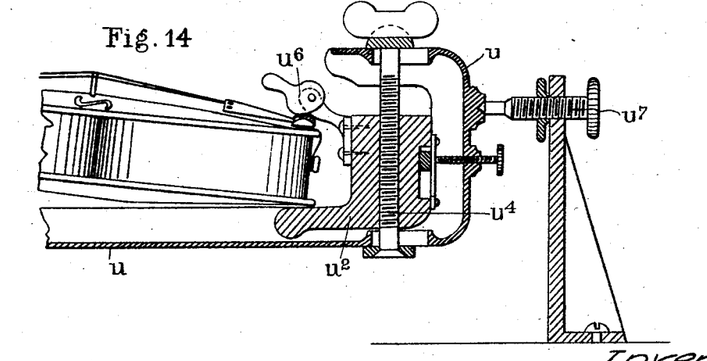

The violin $v$ or other musical instrument having strings and played by means of a bow, is fixed as shown in Figures 13 and 14, in a cradle $u$, capable of receiving instruments of slightly different sizes; this cradle has to allow the necessary adjustments in direction and in height for the strings to be presented suitably towards the bow, as in actual play. These adjustments are allowed by the blocks $u^1$ $u^2$, which can be regulated in height by means of screw-threaded rods $u^3$ $u^4$ with wing nuts. The violin $v$ is placed conveniently in the direction of its length and held upon the blocks $u^1$ $u^2$ by gripping devices $u^5$ $u^6$ of cam-shape designed to engage the two ends of the instrument with interposed packing of more or less elastic nature; these grips $u^5$ $u^6$ are pivoted upon arms projecting from the blocks $u^1$ $u^2$.

Figure 15:
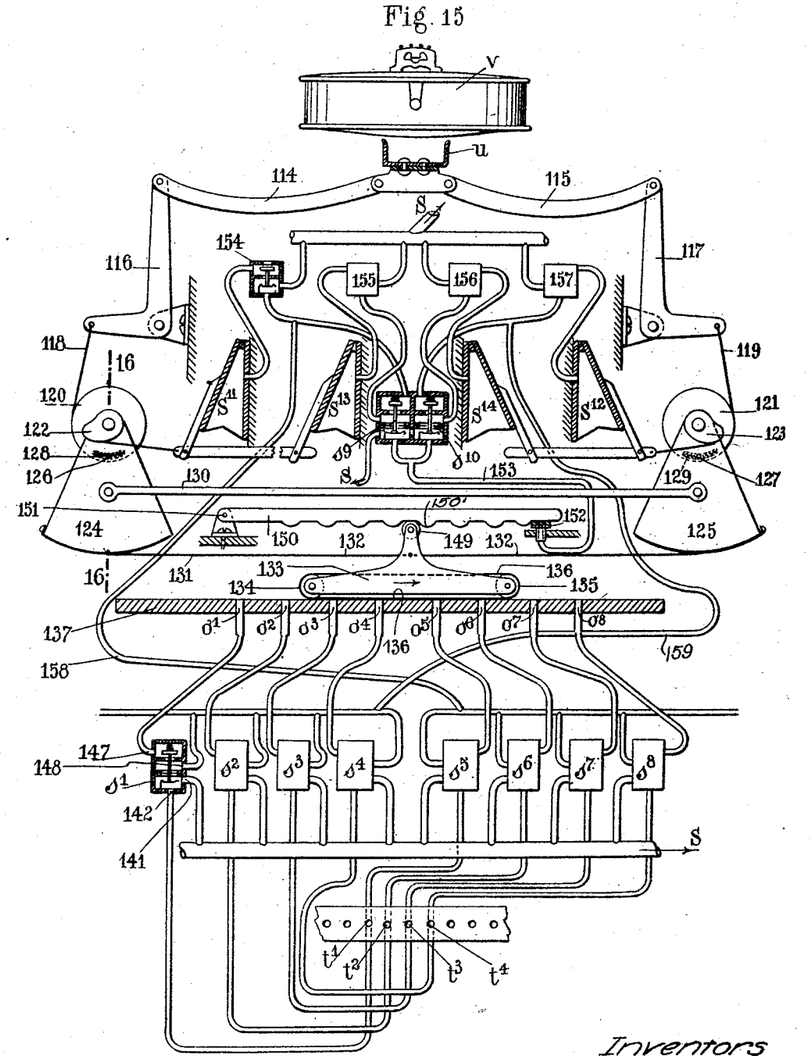
Figure 15 is a general view of the system for changing the strings in play.

The cradle $u$ is suspended between two pivotal points $u^7$ $u^7$, about which it can rock so as to present to the bow the required string or strings. This cradle $u$ is connected as shown in Figures 9 and 15, by links 114, 115, to bell crank levers 116, 117, of which the other ends are connected by bands 118, 119 to pulleys 120, 121, fast to compensating cams 122, 123 actuated by the bellows $S^{11}$, $S^{12}$, $S^{13}$, $S^{14}$. The cams 122, 123, are arranged, as in the case of the cams 72 and 73 in Figure 9, to obtain a constant action of the bellows, whatever be the degree of their opening.

The bellows $S^{11}$ and $S^{12}$ are identical as also the bellows $S^{13}$ and $S^{14}$, but the two former have a smaller sectional area and consequently a lower power than the other two.

Figure 16:
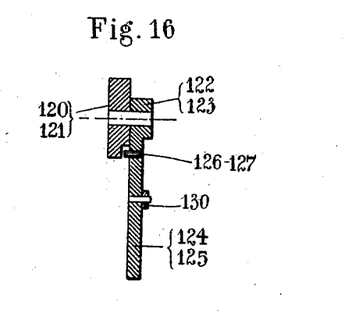
Figure 16 is a detail in section on the line 16—16 of Figure 15.

The cams 122 and 123 are integral with sectors 124, 125; they are coupled elastically to the corresponding pulleys 120, 121 with a certain amount of play, by means of pegs 126, 127 (see Figure 16) engaged in notches in the corresponding pulleys 120, 121, with small coiled springs 128, 129 interposed in these notches on either side of the pegs 126, 127.

The two sectors 124, 125, connected by the rod 130, are also attached by ties 131, 132, to a movable support or cursor 133, which carries at its ends two rollers 134, 135, upon which is mounted an endless band of cloth 136. This cursor 133 can travel when drawn along by the sectors 124, 125, over a stationary plate 137, in which there are provided orifices $o^1, o^2, o^3, o^4, o^5, o^6, o^7, o^8$ leading to special valves designed for double inlet.

Each of these valves $s$ (see Figure 17) are separated by a diaphragm 140, provided with a capillary or bleed hole 140'. The chamber 138 is in communication with the wind or suction through the orifice 141; one of the two working orifices opening into the chamber 139 is shown at 142.

Figure 17:
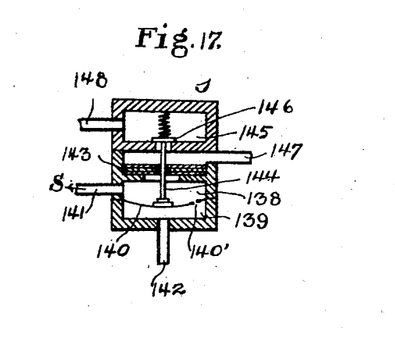
Figure 17 is a section through a double-admission valve, of the kind employed in the string-changing system.

The two chambers 138, 139 are surmounted by a block 143, formed of several plates superposed and provided with an axial hole, through which there passes with as little clearance as possible a rod 144 actuated by the diaphragm of the partition 140; the spaces between the plates of the block 143 thus constitute successive expansion chambers, and no leakage can take place between the chamber 138 and the chamber 145 situated above the block 143. The rod 144 operates a lift valve 146, the opening of which places in communication two orifices 147 and 148 formed in the chamber 145 on opposite sides of this valve 146; the orifice 147 is the second working orifice, while 148 leads to a normal relay valve.

In order that this double-inlet valve $s$ shall be able to actuate the normal relay-valve, it is necessary for the two working orifices 142 and 147 to be uncovered simultaneously; in fact if the orifice 142 alone is uncovered, the valve 146 is indeed lifted from its seat by the action of the suction S applied to the orifice 141, but owing to the air-tight separation between the chambers 138 and 139 on the one hand and 145 on the other hand, the service orifice 148 is not in communication with the outer air, the orifice 147 being assumed to be closed. Similarly, when the latter is open, if the orifice 142 is closed, the valve 146 remains resting on its seat, and there is no communication between the orifices 147 and 148. On the other hand, if the two working orifices 142 and 147 are opened simultaneously, the valve 146 being lifted establishes communication between the orifices 147 and 148, and the normal relay-valve connected to the orifice 148 comes into action.

In the arrangement represented in Figure 15, there are eight double-inlet or admission valves, $s^1, s^2, s^3, s^4, s^5, s^6, s^7, s^8$; one of the working orifices 147 of these valves is connected to the corresponding orifice $o^1, o^2, o^3$, ... $o^8$, of the plate 137 upon which the cursor 133 travels. The other working orifice 142 of these valves is connected to an aperture designed to be unmasked by the perforation in the tune sheet; there are four of these holes, $t^1$, $t^2$, $t^3$, $t^4$, corresponding respectively to the positions upon the four strings. For double-stopping or playing upon two strings at once, it is only necessary that the number of holes $t^1$, $t^2$ ... be seven instead of four, as there are three additional positions required for the cradle carrying the violin (for playing simultaneously upon the first and second strings, upon the second and third, and upon the third and fourth strings), and to increase the number of parts in the same proportion.

In order that one of these valves $s^1$, $s^2$, $s^3$, ... $s^8$ shall come into operation, it is necessary that the two holes $o^1$, $o^2$, ... and $t^1$, $t^2$, ... be uncovered simultaneously by the cursor 133 and by the perforated tune sheet respectively.

The distance between the rollers 134 and 135 on the cursor 133 is such that when the violin is in the playing position, four of the orifices $o^1$, $o^2$, ... $o^8$ leading to the valves $s^1$, $s^2$, ... $s^8$, shall be covered by the cloth 136 mounted on these rollers.

The cursor 133 carries at its upper end a roller 149 in engagement with the lower face of a lever 150, pivoted at a fixed point 151; in the vicinity of the defined positions and on each side of the same, the roller 149 comes into contact with swells or bosses formed on the lower face of this lever and raises it slightly so that it opens the valve 152 facing the free end of this lever. This valve 152 is connected by a pipe 153 to two double-inlet valves $s^9$ and $s^{10}$ analogous to that described with reference to Figure 17; these valves $s^9$ and $s^{10}$ are likewise connected each to two normal relay-valves 154, 155 and 156, 157, respectively.

It will be supposed that the instrument is played in the position $t^2$, that is to say the position for which the perforation in the tune sheet unmasks the aperture $t^2$, connected to one of the working orifices of each of the double-admission valves $s^2$ and $s^6$; the cursor 133 however then closes the orifices $o^2$, and $o^6$, and consequently the double-admission valves $s^2$ and $s^6$ do not operate. When it is required to play in the position $t^3$, the aperture $t^3$ is opened just before the moment at which the change of position is to take place; the apertures $t^2$ and $t^3$ are thus both open at the same time. The orifice $o^7$ being open, the double-admission valve $s^7$ (of which the two working orifices $o^7$ and $t^3$ are open simultaneously) brings into action the normal relay-valve 154, to which it is connected by the pipe line 158; this valve 154 operates the bellows $S^{11}$ and the latter acts upon the pulley and cam device 120, 122. The sector 124 is displaced by the amount allowed by the free play of the peg 127, moving the cursor 133 to the same extent from left to right. But the aperture $t^2$ has remained open until now, and therefore as soon as the cursor 133 has moved and the orifice $o^2$ has been opened, (which is the position shown in the drawing) the double-admission valve $s^2$ operates the normal relay-valve 157 to which it is connected by the pipe 159; the valve 157 actuates the bellows $S^{12}$, operating the pulley and cam device 121, 123, but the violin being acted upon by two equal and opposite forces does not shift. When the moment for passing to the position $t^3$ has arrived, the aperture $t^2$ is masked, so that the normal relay-valve 157 is no longer operated by the double-admission valve $s^2$. The bellows $S^{12}$ ceases to act, and the bellows $S^{11}$ therefore displaces the cursor 133 and the violin $v$ towards the right. As soon as the cursor 133 brings its roller 149 into contact with the corresponding boss 150' upon the lever 150, the valve 152 is opened, and the double-admission valve $s^9$ operates the normal relay-valve 155; the latter actuates the large bellows $S^{13}$ which very rapidly brings the violin into position. The violin cannot move beyond the position $t^3$, because the cursor 133 comes along at the desired moment to close the orifice $o^7$, so that the double-admission valve $s^7$ ceases to function and the bellows $S^{11}$ and $S^{13}$ cease to act. The large bellows $S^{13}$ and $S^{14}$ thus operate in the vicinity of the recognized positions, to start the violin in motion or to retard its movement.

The device thus constituted is such that an accidental deformation of the perforated tune sheet or card acts only momentarily; the instrument is brought back to position as soon as the deformation has passed. If the whole mechanism is well balanced and the deformation of short extent, there is no change of position at all.

Figure 18:
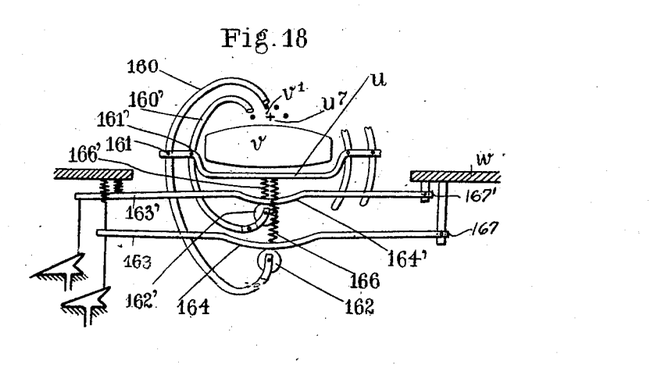
Figure 18 represents the arrangement of the string presser members.
Figure 18A:
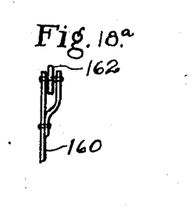

The arrangement of string presser members intended to stop or press upon the strings of the instrument at the points or finger-positions and at the moments desired, is constituted as shown in Figure 18 by a series of curved levers 160, 160', ..., adapted to oscillate about axes 161, 161', ..., secured to the cradle $u$ which supports the instrument $v$. These levers 160, 160', ..., carry at their upper ends which come into contact with the strings $v'$, rubber pads or the like, and at their lower bifurcated ends rollers 162, 162' ... (see Fig. 18$^a$).

Beneath the table $w$ of the apparatus, there are fixed members 163, 163', ..., in equal number to the string-presser members; these members 163, ... do not participate in the movements of the violin but are provided with curved portions 164, 164', ... the center of curvature of which lies at $u^7$ upon the axis of the cradle $u$. The members 163, 163', are pivoted at 167, 167' upon the fixed table $w$ of the apparatus and are rocked around their pivotal axis owing to the operation of the pneumatics 165, 165', ... controlled by the perforation in the tune sheet.

A recoil spring 166, 166', . . . attached to the cradle $u$ and to each of the members 163, tends constantly to return each member 163, 163', . . . upwards; in order to normally present engagement of the rollers 162, . . . therewith, each roller 162, 162', . . . is therefore brought in contact with the corresponding member 163, 163', . . . only when the latter is actuated by the closing of the corresponding pneumatics 165 and is rocked downwards. Through this engagement, the roller 162 . . . rides upon the curved part 164, . . . of the member 163, . . . ; so that the string presser member 160, . . . thus oscillates around its axis 161, . . . and the rubber pad or the like, at its upper end, presses upon the corresponding string $v'$. This arrangement allows of actuating the string presser members before the strings $v'$ come under the bow, which is a condition necessary to the execution of rapid movements or arpeggio chords.

Lastly, the operation of the curved levers 160, 160', . . . creates no twist or couple interfering with the movements of the cradle $u$, because the reaction of the pressure passes through the oscillatory axis $u^7$, $u^7$ of the cradle.

What we claim is:

1. An automatic apparatus for playing a stringed musical instrument, such as a violin, comprising, a bow for vibrating the strings of the instrument to be played, means for carrying the bow, a support for the musical instrument, the musical instrument being mounted in its support so as to be rockable about its axis and to present to the bow the string or strings upon which the latter is to play, pneumatic bellows means for giving the bow carrier means reciprocating movements of a long stroke in a direction perpendicular to the longitudinal axis of the musical instrument, pneumatic bellows means for moving the bow to and from the strings of the instrument, presser members arranged above the strings of the instrument, means comprising a perforated tune sheet for pressing the presser members upon the strings at the positions corresponding to the notes to be played, and controlling means for controlling movements of the bow, the rocking movements of the instrument in its support and the motions of the presser members, by the perforations in the tune sheet corresponding to the piece of music to be played, such controlling means including, two associated pneumatic bellows members ($S^3$, $S^4$, Figs. 9, 9$^a$) operating alternately the one as a driver and the other as a damper, for controlling the movements of the bow carrier means, and regulators ($D^3$, $D^4$, Figs. 9, 9$^a$) for supplying said pneumatic members at a pressure which is maintained constant during their entire stroke, the driving pneumatic member being supplied at a pressure higher than that of the dampening pneumatic member, for the purpose described.

2. Apparatus according to claim 1, and means for varying the difference of pressure in said pneumatic members operating respectively and alternately as a driver and as a damper.

3. Apparatus according to claim 1, a movable flap on each regulator, a balance lever (35, 36) connected to the movable flap of each of the regulators ($D^3$, $D^4$), springs (40, 41) attached to the balance levers so as to give in the regulator, operating the driver $S^3$, a maximum pressure, corresponding to the highest driving force of the bow carrier means, and zero pressure in the regulator operating the damper, a set of bellows (43 . . .) having movable flaps and controlled by the perforated tune sheet, springs (42, 42'. . .), connecting the movable flaps of the bellows to the balance levers (35, 36) whereby, upon actuation of the bellows, they exert on the levers an action opposing that of the first said springs (40, 41), so as to vary the difference of pressure in the regulators ($D^3$, $D^4$) and thereby in the driving and dampening pneumatic members ($S^3$, $S^4$), according to the number of said bellows (42 . . .) which is actuated.

4. Apparatus according to claim 1, pipes (45, 46) connecting said regulators and pneumatic members, a partition in each of said pipes, a plurality of apertures (49, 52) in the partitions, aperture controlling members (48, 51) to control said apertures, a plurality of bellows (43 . . .) controlled by the perforated tune sheet, means operatively connecting the bellows with said aperture controlling members (48, 51) so as to vary the speed of flow of the air between the regulators ($D^3$, $D^4$) and the driving and dampening pneumatic members ($S^3$ $S^4$) in accordance with the number of bellows (43 . . .) which are actuated by the perforated tune sheet.

5. Apparatus according to claim 1, piping (45, 46, 57, 58, 59) connecting said regulators and pneumatic members, a reversing valve ($S^1$ Figs. 9 and 12) positioned in said piping to establish in the correct sense the difference of pressure supplied by the regulators, bellows (63, 64, 65, Fig. 12), controlled by the perforated tune sheet, and an operative connection between the bellows and the reversing valve.

6. Apparatus according to claim 1, a fixed track arranged at right angles to the longitudinal axis of the instrument to be played, said bow carrying means including a system of jointed parallelograms, a carriage on the track and supporting said system, means for the carriage to receive a reciprocating movement upon the track under the control of said driving and dampening pneumatic members (S³ S⁴), and means for securing the bow near its heel to the system of jointed parallelograms, and leaving it entirely free at its other end.

7. Apparatus according to claim 1, a fixed track arranged at right angles to the longitudinal axis of the instrument to be played, said bow carrying means including a system of jointed parallelograms, a carriage on the track and supporting said system, means for the carriage to receive a reciprocating movement upon the track under the control of said driving and dampening pneumatic members (S³ S⁴), two pneumatic devices (A, B, Fig. 1) acting in opposite directions to one another and connected to the system of jointed parallelograms, means whereby the bow is applied to the strings of the instrument with a pressure equal to the difference of pressure in the pneumatic devices the bow leaving the strings or being pressed thereon with a suddenly increased force, according as the force of one or the other of the pneumatic devices is suddenly annulled, and means for annulling the pneumatic devices by placing them in communication with atmosphere.

8. Apparatus according to claim 1, a fixed track arranged at right angles to the longitudinal axis of the instrument to be played, said bow carrying means including a system of jointed parallelograms, a carriage on the track and supporting said system, means for the carriage to receive a reciprocating movement upon the track under the control of said driving and dampening pneumatic members (S³ S⁴), and means for securing the bow near its heel to the system of jointed parallelograms, and leaving it entirely free at its other end, two oppositely acting pneumatic devices (A, B) having movable flaps, and means so connecting the flaps to the system of jointed parallelograms, that the resultant effect exerted by the devices is transmitted through the jointed system to the bow, to thereby press it against the strings, whatever be the flexion of the bow and the strings and whatever be the heel or tip portion of the bow in operation.

9. Apparatus according to claim 1, a fixed track arranged at right angles to the longitudinal axis of the instrument to be played, said bow carrying means including a system of jointed parallelograms, a carriage on the track and supporting said system, means for the carriage to receive a reciprocating movement upon the track under the control of said driving and dampening pneumatic members (S³ S⁴), two oppositely acting pneumatic devices (A, B) connected to the system of jointed parallelograms, means for supplying one of such devices (B) at a constant pressure, and means for supplying the other device (A) at a variable pressure, the last said means comprising a pressure regulator (D¹, Fig. 9ᵃ) and means for varying at will the pressure of said regulator.

10. Apparatus according to claim 1, a fixed track arranged at right angles to the longitudinal axis of the instrument to be played, said bow carrying means including a system of jointed parallelograms, a carriage on the track and supporting said system, means for the carriage to receive a reciprocating movement upon the track under the control of said driving and dampening pneumatic members (S³ S⁴), bellows (S⁵ S⁶ Figs. 9, 9ᴬ), controlled by the perforated tune sheet, movable flaps on the bellows, connections (105, 106, 108, 111) from the movable flaps to one of the parallelograms for giving the bow rapid longitudinal oscillations of small amplitude similar to those usually imparted to a bow by the wrist of a performer.

11. Apparatus according to claim 1, a braking means, (74, 75, 101, 102, Figs. 9, 9ᴬ) a bellows (S²) controlling the braking means, such braking means opposing displacements of said means for carrying the bow by a substantially constant resistance, regardless of the variations of the passive resistances, and means for automatically diminishing the braking force which is normally established at a fixed value, upon the bow carriage encountering an abnormal resistance.

12. Apparatus according to claim 1, a braking means, (74, 75, 101, 102, Figs. 9, 9ᴬ) a bellows (S²) controlling the braking means, such braking means opposing displacements of said means for carrying the bow by a substantially constant resistance, regardless of the variations of the passive resistances, a regulator (D², Fig. 9ᴬ) for supplying the bellows at a constant pressure, means (92, 93, 94, 96, 95, 97) for automatically placing the bellows in communication with the atmosphere when the bow carriage encounters an abnormal passive during its displacement, a movable flap on the bellow, spring means (98, Fig. 9) connected to the movable flap of the bellows, and lever means (99, 100) connected to the spring means and controlling the braking force exerted by the braking means (74, 75, 101, 102).

13. An apparatus for playing stringed instruments, comprising, a cradle (u) for the instrument (v), means permitting the cradle to rock about an axis so as to present to a bow the string or strings upon which the latter is to play, in combination with bellows, means for controlling the bellows by perforated tune sheet to cause a rapid passage from one position to another of the cradle, the bellows being arranged in two pairs (S¹¹ S¹³) and (S¹² S¹⁴ Fig. 15) corresponding to the two directions of movement of the cradle, one bellows of each pair ($S^{13}$ and $S^{14}$) being larger and stronger in action than the others ($S^{11}$, $S^{12}$), of the pairs, and means for operating the larger bellows ($S^{13}$, $S^{14}$) when the cradle is adjacent its positions for playing, so as to initiate the motion of the cradle, and to retard its motion.

14. An apparatus for playing stringed instruments, comprising, a cradle ($u$) for the instrument ($v$), means permitting the cradle to rock about an axis so as to present to a bow the string or strings upon which the latter is to play, in combination with bellows, means for controlling the bellows by a perforated tune sheet to cause a rapid passage from one position to another of the cradle, means for operating the bellows, comprising a plurality of special valves ($s^1 \ldots s^8$), corresponding to the different positions in which the instrument is to be played upon, each of the special valves comprising two inlets, means to simultaneously uncover the inlets for operating the bellows ($S^{11}$ $S^{12}$, $S^{13}$ $S^{14}$), and means whereby one of the inlet operating means is controlled by the perforated tune sheet, and the other operating means by the position of the cradle itself.

15. Apparatus according to claim 1, a curved lever, the said string pressure (Fig. 18) being arranged upon one end of curved lever (160 . . . ) and the lever being pivoted upon said instrument support, a pivoted member (163 . . . ) pivoted at a fixed point on the support, a curved portion (164) on the pivoted member having its center of curvature in the axis of oscillation of the support, a roller (162) at the other end of the curved lever (160) arranged to engage with the curved portion of said pivoted member, and a bellow (165), controlled by the perforated tune sheet and connected to said pivoted member (164), operation of the bellows bringing the pivoted lever into engagement with the roller.

In testimony whereof we have signed our names to this specification.

EMILE AUBRY.
GABRIEL BOREAU.